(12) United States Patent
Ono et al.

(10) Patent No.: US 7,675,552 B2
(45) Date of Patent: Mar. 9, 2010

(54) FLICKER CORRECTION METHOD AND DEVICE, AND IMAGING DEVICE

(75) Inventors: Noriyuki Ono, Kanagawa (JP);
Motohiro Nakasuji, Kanagawa (JP);
Yoshiaki Nishide, Kanagawa (JP);
Hiromasa Ikeyama, Tokyo (JP)

(73) Assignee: Sony Corporation, Tokyo (JP)

( * ) Notice: Subject to any disclaimer, the term of this patent is extended or adjusted under 35 U.S.C. 154(b) by 855 days.

(21) Appl. No.: 11/375,013

(22) Filed: Mar. 15, 2006

(65) Prior Publication Data
US 2006/0232686 A1 Oct. 19, 2006

(30) Foreign Application Priority Data
Apr. 19, 2005 (JP) ............. 2005-121424

(51) Int. Cl.
*H04N 9/73* (2006.01)
(52) U.S. Cl. .................. 348/228.1
(58) Field of Classification Search ............. 348/226.1, 348/227.1, 228.1, 364, E5.034, E5.035
See application file for complete search history.

(56) References Cited

U.S. PATENT DOCUMENTS

| 2002/0044205 A1* | 4/2002 | Nagaoka et al. ............. 348/229 |
| 2003/0142239 A1* | 7/2003 | Yoshida et al. ............. 348/607 |
| 2004/0109069 A1* | 6/2004 | Kaplinsky et al. ......... 348/226.1 |
| 2005/0093996 A1* | 5/2005 | Kinoshita ................ 348/226.1 |

FOREIGN PATENT DOCUMENTS

| EP | 1 566 962 A1 | 8/2005 |
| JP | 11313226 A | * 11/1999 |
| JP | 2004-222228 | 8/2004 |

* cited by examiner

*Primary Examiner*—Jason Whipkey
(74) *Attorney, Agent, or Firm*—Oblon, Spivak, McClalland, Maier & Neustadt, L.L.P.

(57) ABSTRACT

Even in case the shutter speed is high, a flicker can be corrected accurately. A flicker correction method in which a flicker is corrected by predicting, from a present input frame image, a flicker component in an image of a next frame and adding a correction value to the next frame image on the basis of the predicted flicker component includes holding a plurality of flicker data, calculating the correction value by combining a plurality of flicker data together at a ratio set correspondingly to a shutter speed and frame rate, and adding the calculated correction value to the input image signal.

8 Claims, 13 Drawing Sheets

Flicker image when image sensor is of global shutter type

FIG.4 RELATED ART — Flicker image when image sensor is of rolling shutter type

30fps, No shutter release

30fps, 1/1000s in shutter speed

30fps, 1/2000s in shutter speed

RELATED ART

FLICKER CORRECTION METHOD AND DEVICE, AND IMAGING DEVICE

CROSS REFERENCES TO RELATED APPLICATIONS

The present invention contains subject matter related to Japanese Patent Application JP 2005-121424 filed in the Japanese Patent Office on Apr. 19, 2005, the entire content of which is incorporated herein by reference.

BACKGROUND OF THE INVENTION

1. Field of the Invention

The present invention relates to a flicker correction method and device, and an image pickup device, in which a flicker is corrected by subtracting a flicker correction signal from an image signal.

2. Description of the Related Art

When an object is imaged with a digital camera under the light of a light source that repeats turning on and off cyclically, such as a fluorescent lamp, cyclic light and dark fringes will appear in a captured image of the object, resulting in that they will seemingly run in the image. Otherwise, there will cyclically take place a difference in brightness between frames over an image. This is called "flicker". The flicker is a problem unavoidably taking place when an object is imaged with a digital camera using an image sensor to image the object under the light of a flickering light source with the timing of charge storage being shifted.

In the conventional the image sensor, the timing of charge storage varies depending upon whether the charge storage is made per plane or per line. Generally, timing of the charge storage per plane is called "global shutter system" while timing of the charge storage per line is called "rolling shutter system".

Most of the CCDs have adopted an image sensor of the global shutter type in the past. Recently, however, increasingly more attention has been paid to the CMOS image sensors that consume less power than the CCDs and can be produced more inexpensively than the CCDs because of their smaller number of parts. Many of the CMOS image sensors adopt the rolling shutter system for their structural problem. With one of the two shutter systems, when imaging is made under the light of a light source repeating turning on and off, light and dark fringes will appear in an entire image plane (plane flicker), while with the other shutter system, light and dark fringes will appear per line (in-plane flicker).

FIG. 1 shows a difference in amount of charge storage in an image sensor adopting the global shutter system, and FIG. 2 shows an example of image incurring a plane flicker when the image sensor is of the global shutter type. FIG. 3 shows a difference in amount of charge storage in an image sensor adopting the rolling shutter system, and FIG. 4 shows an example of image incurring an in-plane flicker. Also, a flicker component included in an image captured under the light of a light source cyclically turning on and off can be approximated to a sinusoidal wave, and there has been prevalent the method of forming a corrected image by removing the flicker on the basis of the nature of the sinusoidal wave.

For the flicker correction, there was proposed a method of controlling the gain on the basis of a flicker component detected in an input image (as in the Japanese Patent Application Laid Open No. 2004-222228.

SUMMARY OF THE INVENTION

For flicker correction, the feature that a flicker can be approximated to a sinusoidal wave is utilized to detect a flicker component in an input signal. Similarly, a correction amount is calculated from the characteristic of the sinusoidal wave and detected flicker component, and the correction amount is added to the input signal or the latter is multiplied by the correction amount. For approximation of the flicker component to the sinusoidal wave, three features "cycle", "phase" and "amplitude" have to be detected.

A cycle can be detected based on a power supply frequency and frame rate.

On this account, the Applicant of the present invention proposed a flicker correction method including the steps of acquiring a flicker correction signal corresponding to a flicker component included in each of specific periods of a video signal formed from a succession of the specific periods and containing the flicker component in response to a correction error signal for each specific period and calculating the flicker correction signal and each specific period to generate a corrected video signal for one specific period, whose flicker component has been corrected, detecting a correction error of the flicker component in the corrected video signal for one specific period before each of the specific periods and each specific period to acquire the correction error signal as one corresponding to the detected correction error, and acquiring the flicker correction signal as one which reduces the correction error correspondingly to the correction error signal (as in the Japanese Patent Application Laid Open No. 2004-330299).

In the above method, sinusoidal wave data is pre-stored in a ROM or the like, data corresponding to a flicker component on a present line is read from the ROM, a correction value is calculated by appropriately converting the read data and the correction value is added to an input image, thereby making flicker correction.

In case the flicker correction is made by adding the correction value to the input image as above, however, when the light from a fluorescent lamp is approximated to a sinusoidal wave, the flicker component can sufficiently be approximated to the sinusoidal wave if the frame rate and shutter speed are slow. However, when the shutter is released at a high speed, the flicker component cannot be approximated to the sinusoidal wave.

FIG. 5 shows a flicker component when the shutter is not released under the light of a fluorescent lamp whose power supply frequency is 50 Hz and at a frame rate of 30 fps. FIG. 6 shows a flicker component when the shutter speed is 1/1000 s with the power supply frequency and frame rate are the same as those in FIG. 5. FIG. 7 shows a flicker component when the shutter speed is 1/2000 sec and the power supply frequency and frame rate are the same as those in FIG. 5. As will be seen from FIGS. 6 and 7, as the shutter speed is increased, the approximation of the flicker component to a sinusoidal wave is limited.

Also, FIGS. 8 and 9 schematically show relations between an exposure time, timing of charge storage and flicker.

It is therefore desirable to overcome the above-mentioned drawbacks of the related art by providing a flicker correction method and device, and an image pickup device, in which a flicker can be corrected with an improved accuracy even when the shutter speed is high.

According to the present invention, there is provided a flicker correction method in which a flicker is corrected by predicting, from a present input frame image, a flicker component in an image of a next frame and adding a correction value to the next frame image on the basis of the predicted flicker component, the method including the steps of holding a plurality of flicker data, calculating the correction value by combining a plurality of flicker data together at a ratio set correspondingly to a shutter speed and frame rate, and adding the calculated correction value to the input image signal, thereby making flicker correction.

According to the present invention, there is also provided a flicker correction device including a flicker correcting means for making flicker correction by adding a flicker correction signal to an input image signal, and a correction error detecting means for detecting a correction error by predicting, based on an image signal whose flicker has been corrected by the flicker correcting means and an image signal whose flicker is not yet corrected, a correction error by predicting a flicker image resulted from correction-level flicker correction of an image signal of an image of a next and making a comparison between the predicted flicker imager and input next-frame image signal, the flickering correcting means including a flicker correction signal generating means for generating a flicker correction signal by reading a plurality of flicker data from a flicker data memory holding a plurality of flicker data correspondingly to the correction error detected by the correction error detecting means and combining a plurality of flicker data together at a ratio set correspondingly to a shutter speed and frame rate of the input image signal.

According to the present invention, there is also provided an image pickup device including a flicker correction device in which a flicker is corrected by adding a flicker correction signal to an image signal acquired by an image sensing means, the flicker correction device including a flicker correcting means for making flicker correction by adding a flicker correction signal to an input image signal, and a correction error detecting means for detecting a correction error by predicting, based on an image signal whose flicker has been corrected by the flicker correcting means and an image signal whose flicker is not yet corrected, a correction error by predicting a flicker image resulted from correction-level flicker correction of an image signal of a next frame and making a comparison between the predicted flicker imager and input next-frame image signal, the flickering correcting means including a flicker correction signal generating means for generating a flicker correction signal by reading a plurality of flicker data from a flicker data memory holding a plurality of flicker data correspondingly to the correction error detected by the correction error detecting means and combining a plurality of flicker data together at a ratio set correspondingly to a shutter speed and frame rate of the input image signal.

According to the present invention, a highly accurate correction value can be calculated using a plurality of correction data for the flicker correction to make high-accuracy flicker correction even at a high frame rate and shutter speed. Also, the ratio of combination between a plurality of correction data can be set appropriate correspondingly to a shutter speed and frame rate to approximate a calculated correction value to an ideal flicker component. Therefore, a flicker can be corrected accurately even during high-speed imaging, namely, even at a high frame rate and shutter speed, which is one feature of the CMOS image sensor, and a correction value can be calculated flexibly correspondingly to a frame rate and shutter speed.

DETAILED DESCRIPTION OF THE PREFERRED EMBODIMENTS

The present invention will be described in detail below concerning the embodiments thereon with reference to the accompanying drawings. It should be noted that the present invention is not limited to the embodiments which will be described herebelow but it may be can be modified in various manners, constructed alternatively or embodied in various other forms without departing from the scope and spirit thereof.

Figure 1:
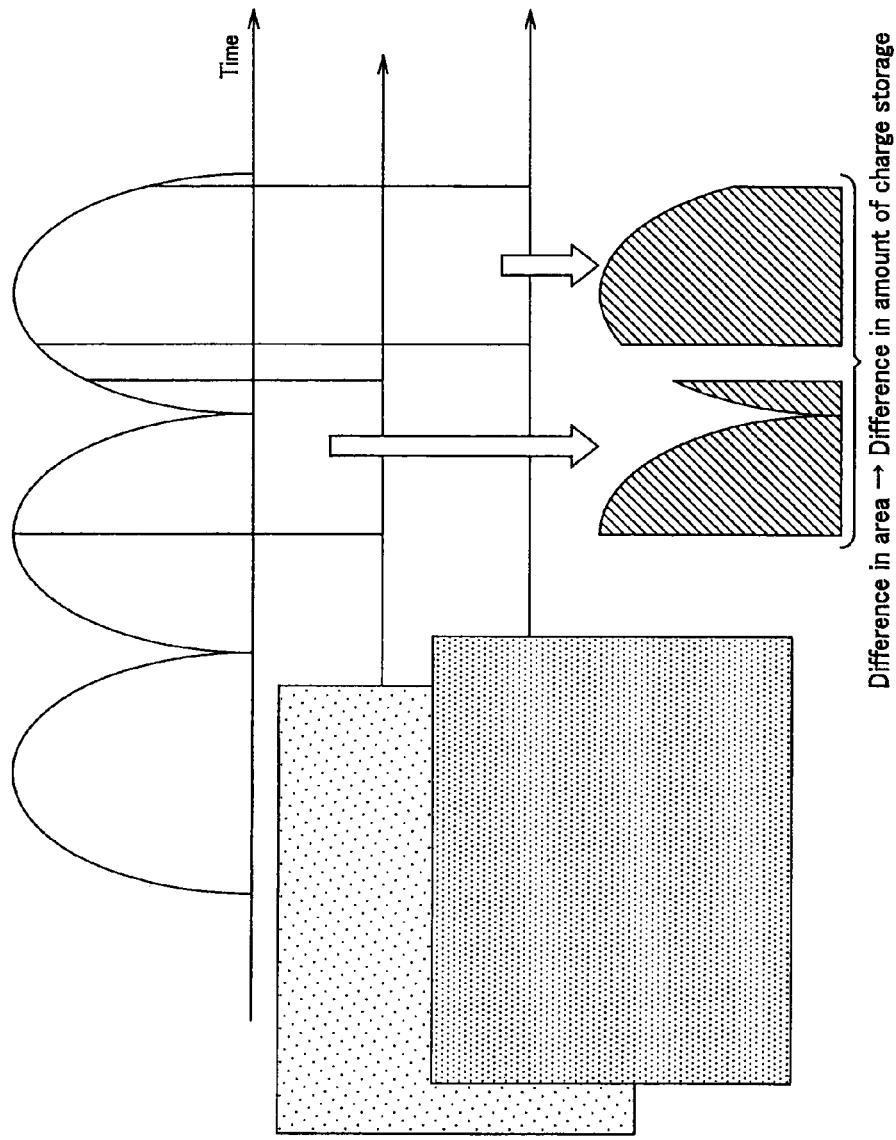
FIG. 1 schematically illustrates a difference in amount of charge storage in an image sensor of the global shutter type.
Figure 2:
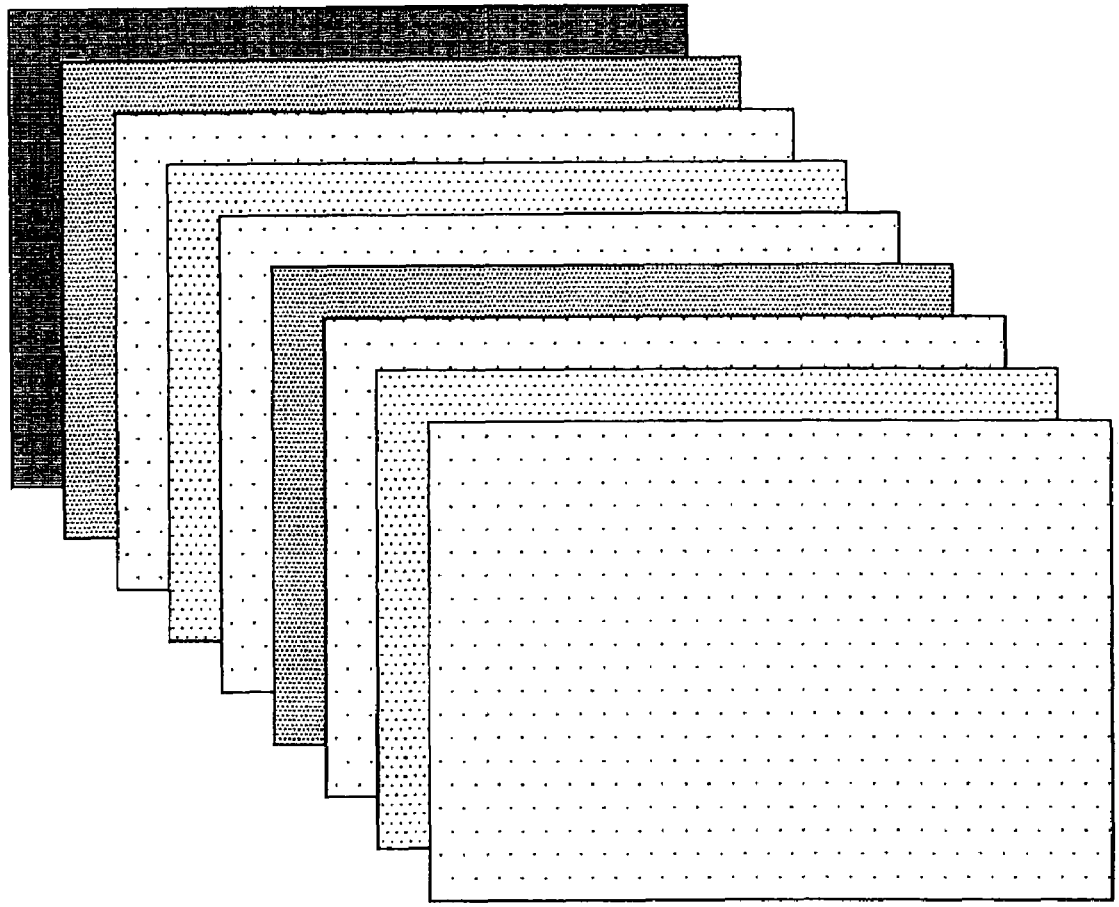
FIG. 2 schematically illustrates an example of plane flicker image appearing when the global shutter system is adopted.
Figure 3:
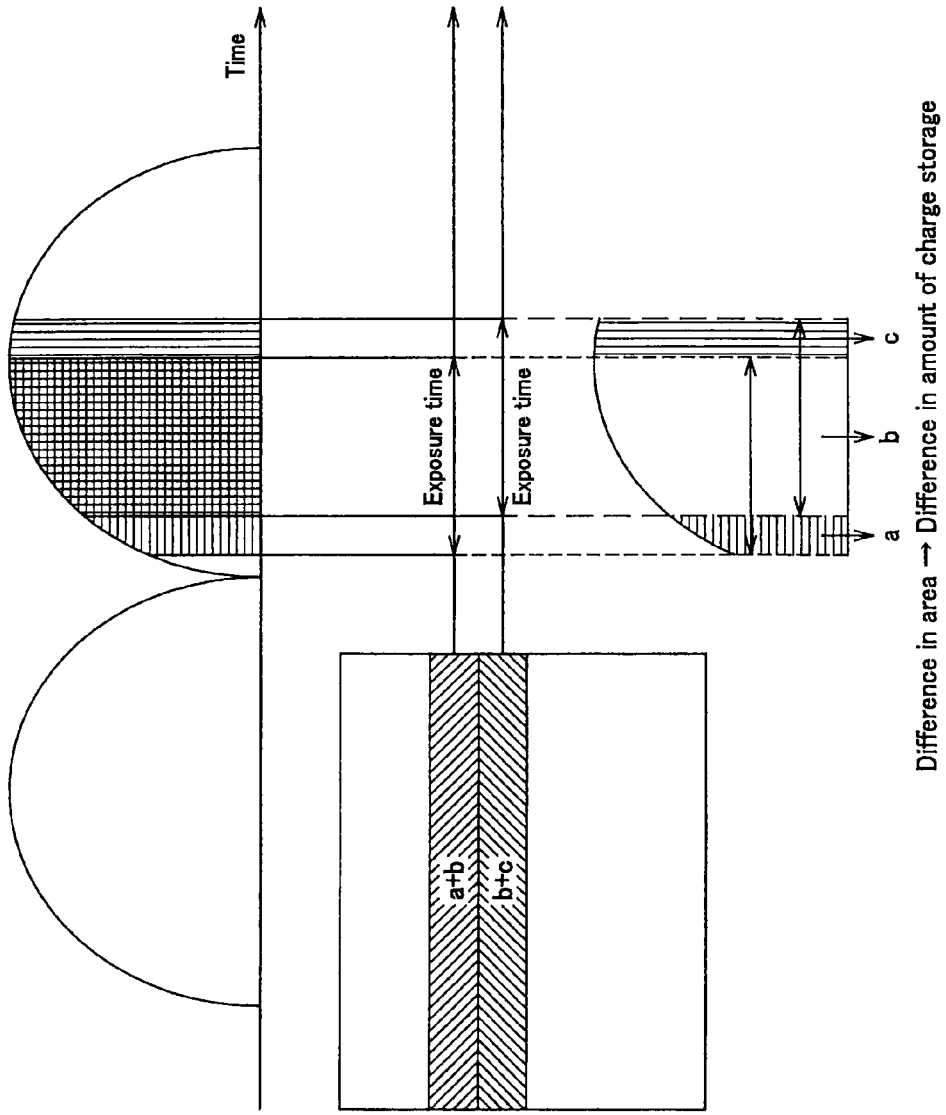
FIG. 3 schematically illustrates a difference in amount of charge storage in an image sensor of the rolling shutter type.
Figure 4:
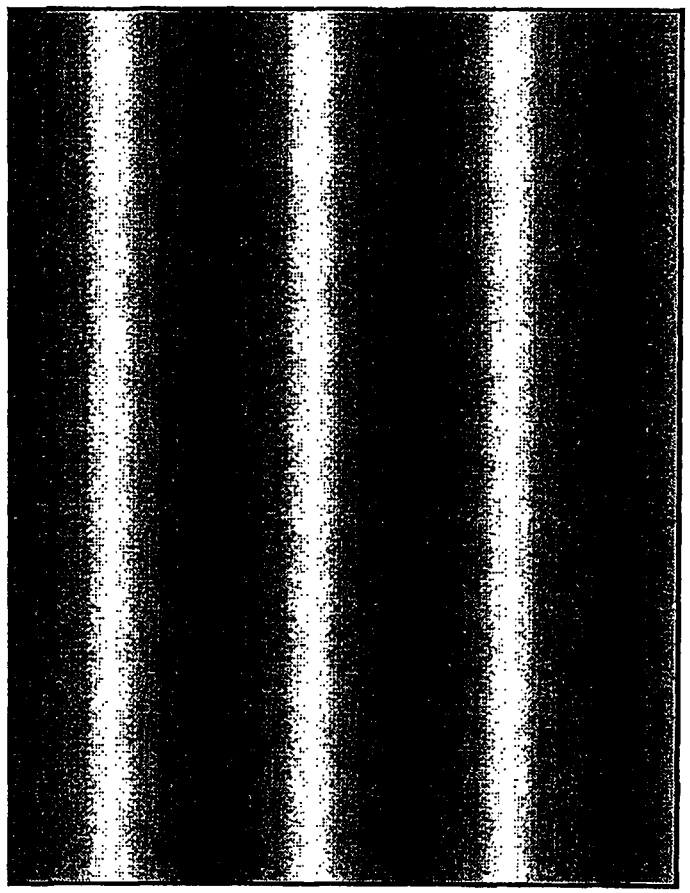
FIG. 4 schematically illustrates an example of in-plane flicker image.
Figure 5:
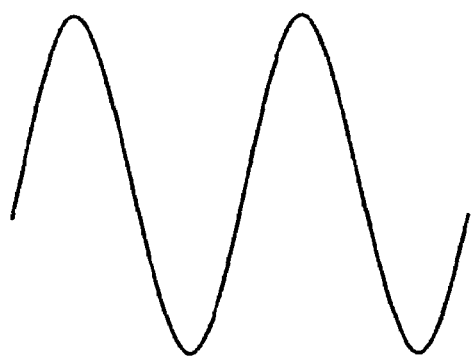
FIG. 5 schematically illustrates a flicker component when the shutter is not released under the light of a fluorescent lamp whose power supply frequency is 50 Hz and at a frame rate of 30 fps.
Figure 6:
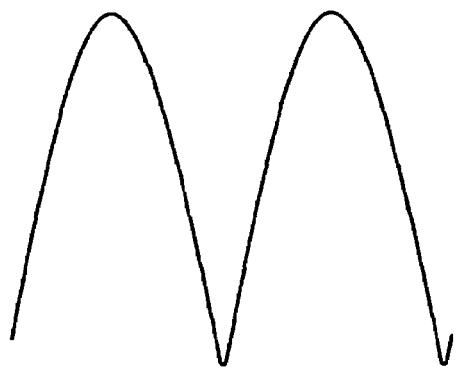
FIG. 6 shows a flicker component when the shutter is released at a speed of $1/1000$ s with the same power supply frequency and frame rate as in FIG. 5.
Figure 7:
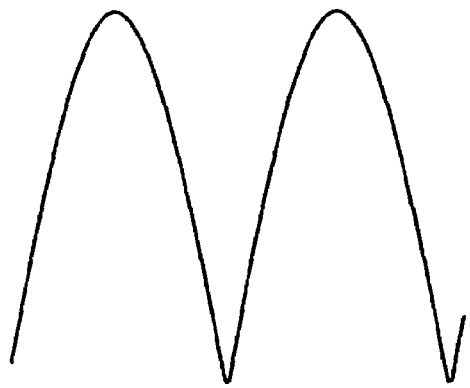
FIG. 7 shows a flicker component when the shutter is released at a speed of $1/2000$ sec with the same power supply frequency and frame rate as in FIG. 5.
Figure 8:
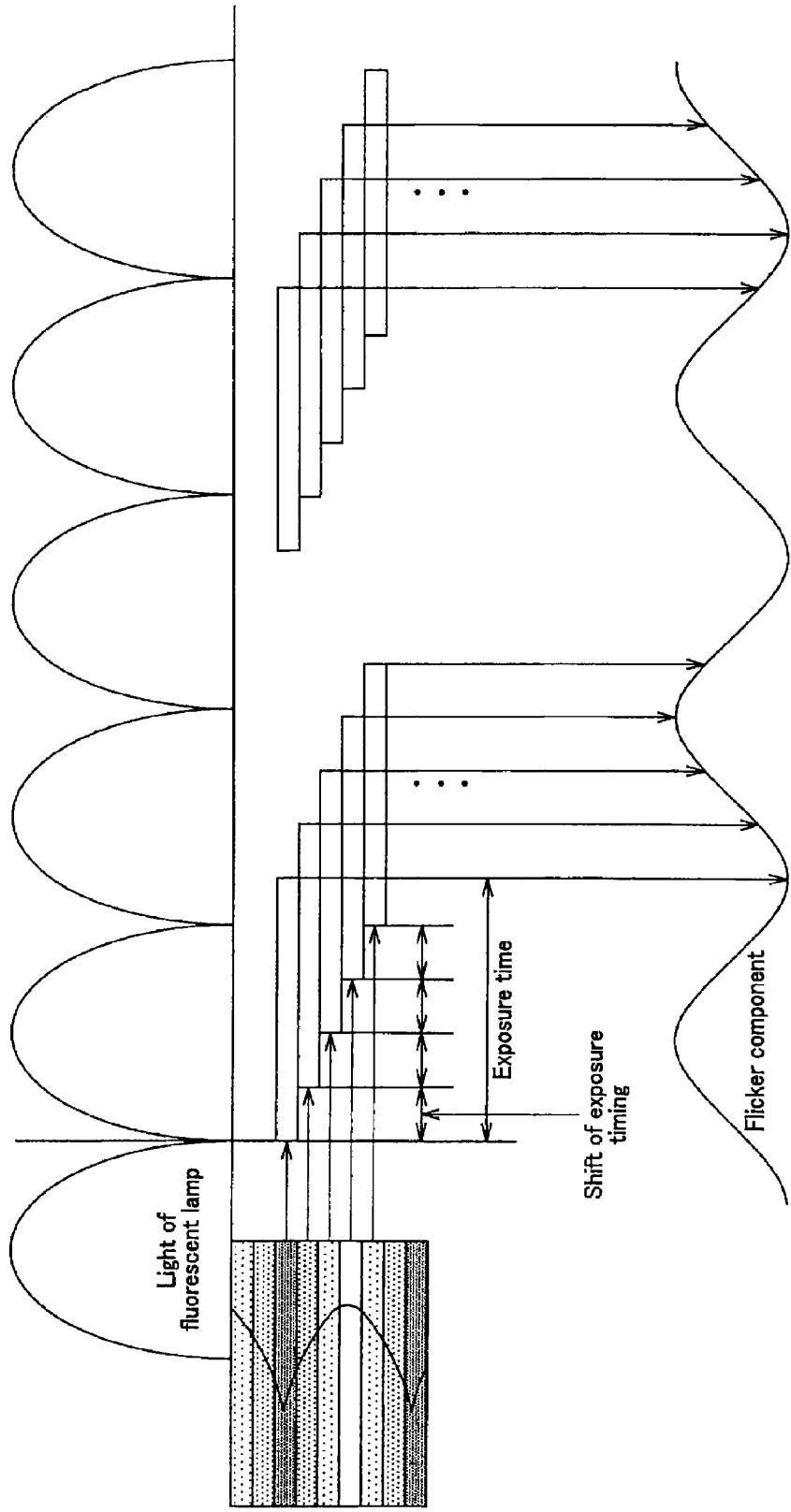
FIG. 8 schematically illustrates a relation between an exposure time, timing of charge storage and flicker.
Figure 9:
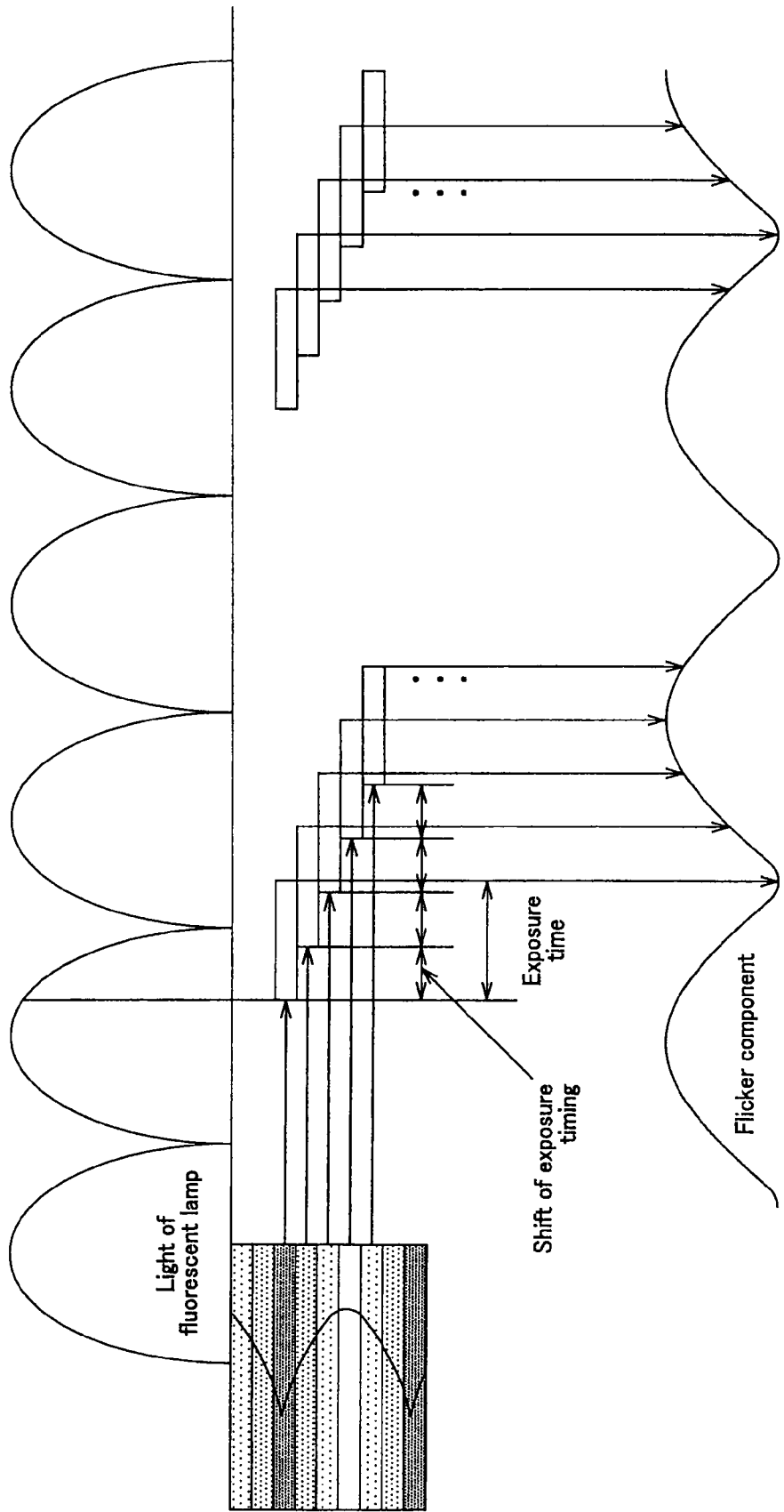
FIG. 9 schematically illustrates a relation between an exposure time, timing of charge storage and flicker.
Figure 10:
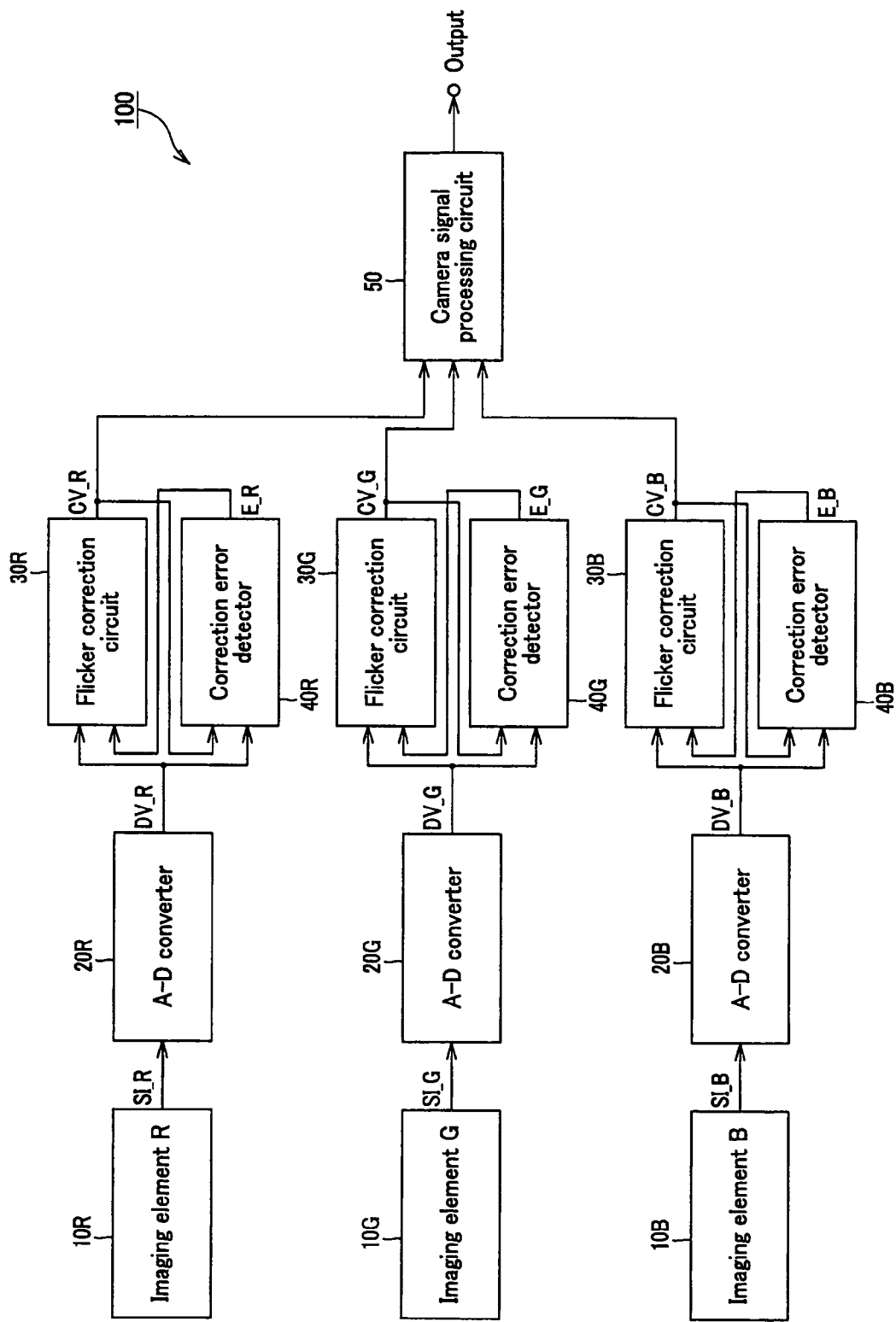
FIG. 10 is a schematic block diagram of an image pickup device as one embodiment of the present invention.

The present invention is applicable to an image pickup device constructed as shown in FIG. 10. The image pickup device is generally indicated with a reference numeral 100.

The image pickup device 100 includes a red color image sensing device (imaging element) 10R, green color image sensing device (imaging element) 10G, blue color image sensing device (imaging element) 10B, A-D converters 20R, 20G and 20B to digitize image signals SI_R, SI_G and SI_B of color images captured by the image sensing devices 10R, 10G and 10B, respectively, flicker correction circuits 30R, 30G and 30B and correction error detectors 40R, 40G and 40B, supplied with the image signals DV_R, DV_G and DV_B digitized by the A-D converters 20R, 20G and 20B, respectively, camera signal processing circuit 50 supplied with image signals CV_R, CV_G and CV_B flicker-corrected by the flicker correction circuits 30R, 30G and 30B, respectively, etc.

Supplied with the image signals CV_R, CV_G and CV_B flicker-corrected by the flicker correction circuits 30R, 30G and 30B, respectively, the correction error detectors 40R, 40G and 40B detect correction errors of the image signals CV_R, CV_G and CV_B, in the digitized image signals DV_R, DV_G and DV_B and flicker-corrected image signals CV_R, CV_G and CV_B, to generate correction error signals E_R, E_G and E_B, and supply the generated correction error signals E_R, E_G and E_B to the flicker correction circuits 30R, 30G and 30B, respectively.

Figure 11:
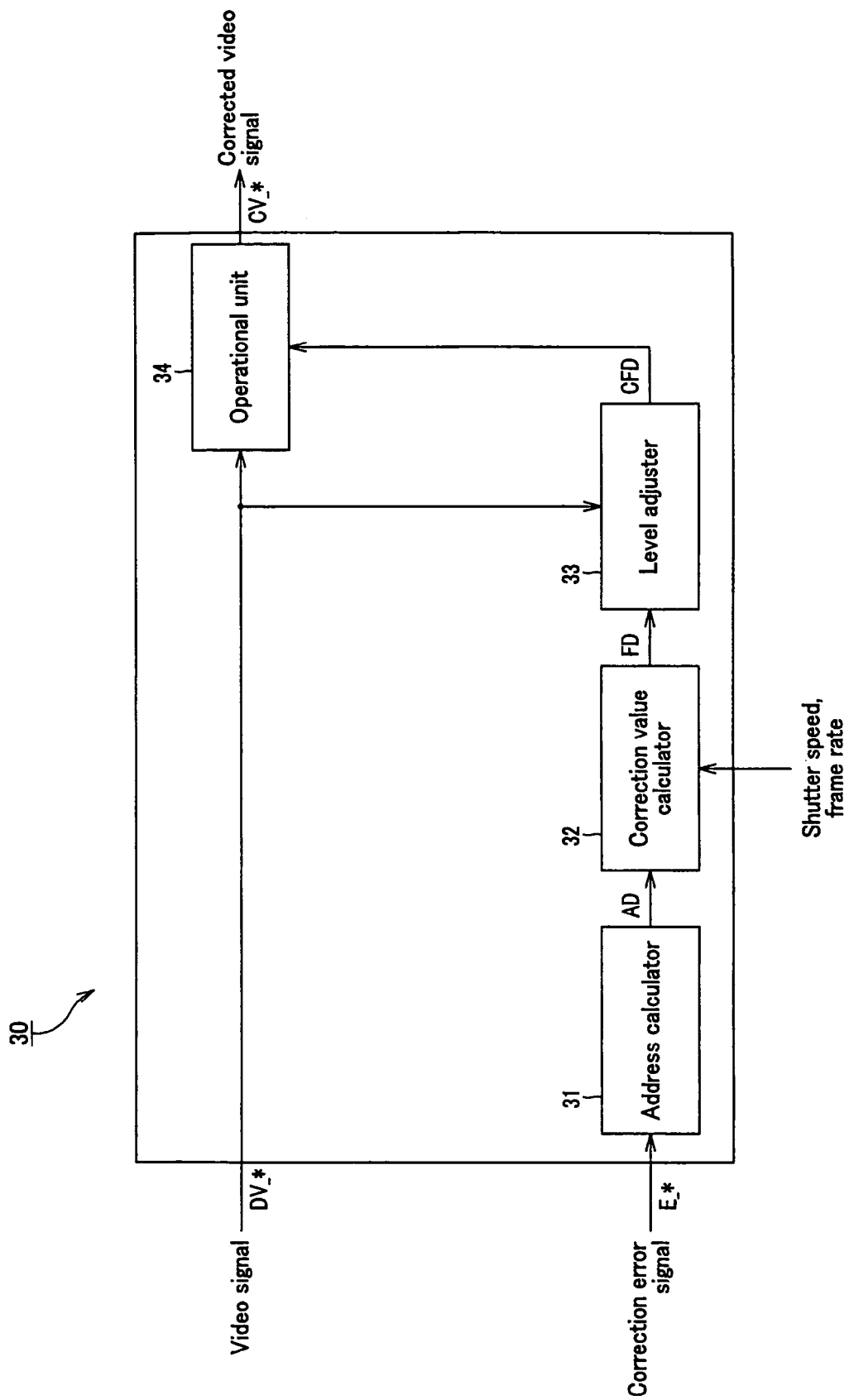
FIG. 11 is also a schematic block diagram of a flicker correction circuit included in the image pickup device shown in FIG. 10.

In the image pickup device 100, each of the flicker correction circuits 30R, 30G and 30B uses a flicker correction circuit 30* constructed as shown in FIG. 11. It should be noted here that the asterisk (*) stands for "R (red)", "G (green)" and "B (blue)".

The flicker correction circuit 30* includes an address calculator 31* supplied with a correction error signal E_* from the correction error detector 40*, correction value calculator 32* supplied with an address AD calculated by the address calculator 31*, level adjuster 33* supplied with flicker correction data FD calculated by the correction value calculator 32*, and an operational circuit 34* supplied with an image signal DV_* digitized by the A-D converter 20*. The image signal DV_* digitized by the A-D converter 20* is supplied to the level adjuster 33* that will then generate a flicker correction value CFD which is to be supplied to the operational circuit 34*.

In the flicker correction circuit 30* constructed as above, the address calculator 31* calculates an address AD in ROMs (flicker memories 321 and 322 which will further be described in detail later) included in the correction value calculator 32* on the basis of the correction error signal E_* supplied from the correction error detector 40*.

The address calculator 31* calculates the address of a present line by calculating the address of a first line in a frame of interest from a power supply frequency and frame rate, and calculating an address increment at each advance by one line toward the address. More specifically, in case the power supply frequency is 50 Hz, frame rate is 30 Hz and the number of vertical clocks of the image sensing device 10* is 1125 clk (these power supply frequency, frame rate and number of clocks of the image sensing device 10* remain unchanged through the following description), the period T between light and dark fringes of a flicker will contain 337.5 lines as given below by an equation 1:

$$T = 30\ Hz \times 1125\ clk/(50\ Hz \times 2) = 337.5\ (clk) \quad (1)$$

Also, the ROM in the system holds flicker data resulted from division of one period by 512. At each advance by one line, the address in the ROM will be incremented by about 1.51703 as given below by an equation 2:

$$512/337.5 = 1.51703 \quad (2)$$

That is, on the assumption that the correction wave address on the first line is zero (0), the address on the 100th line counted from the first line will be 152 as given below by an equation 3:

$$0 + 1.51703 \times 100 \approx 152 \quad (3)$$

Figure 12:
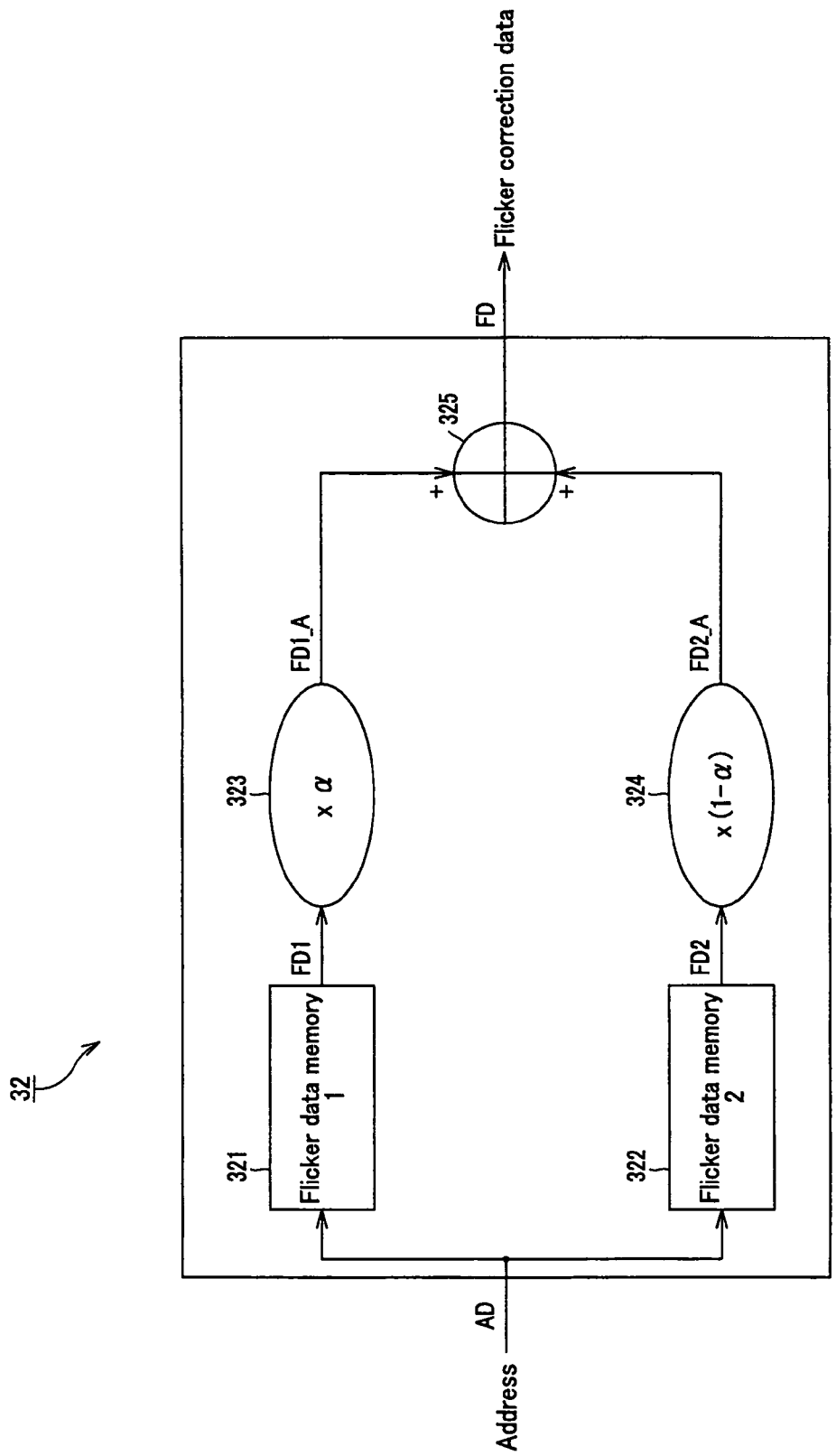
FIG. 12 is a schematic block diagram of a correction value calculator in the flicker correction circuit.

As shown in FIG. 12, the correction value calculator 32* includes flicker memories 321 and 322, multipliers 323 and 324 to multiply two types of flicker data FD1 and FD2 read from the flicker memories 321 and 322 by coefficients α and α−1, respectively, and an adder 325 supplied with flicker data FD1_A and FD2_A multiplied by the coefficients α and α−1, respectively, by the multipliers 323 and 324, respectively. The two types of flicker data FD1 and FD2 will be read from the flicker memories 321 and 322, respectively, according to the address AD calculated by the address calculator 31*.

The correction value calculator 32* reads the two types of flicker data FD1 and FD2 from the flicker memories 321 and 322, respectively, on the basis of the address AD calculated by the address calculator 31*, multiplies the flicker data FD1 and FD2 by the coefficients α and α−1, respectively, by the multipliers 323 and 324, respectively, correspondingly to a frame rate and shutter speed, and adds the results together by the adder 325, to thereby calculate one flicker correction data FD.

Figure 13A:
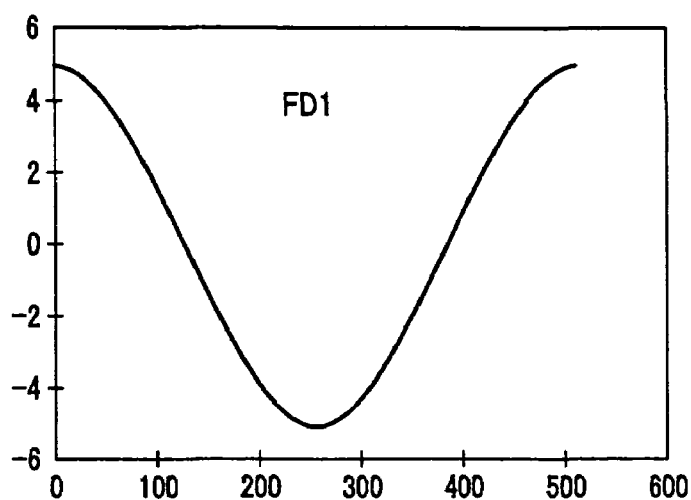
FIG. 13, including FIGS. 13A, 13B and 13C, schematically illustrates a waveform represented by two types of flicker data held in the correction value calculator and a waveform represented by flicker correction data combined together later.
Figure 13B:
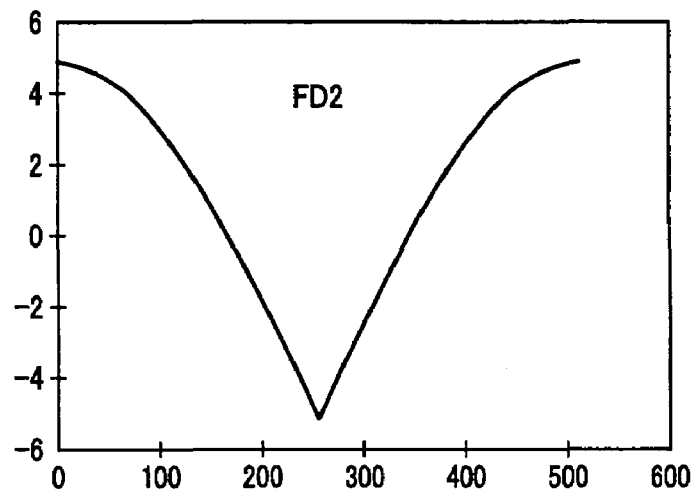
Figure 13C:
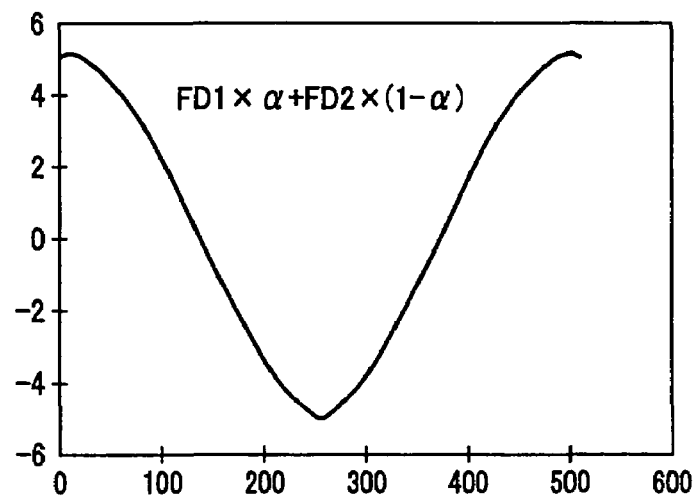

Note that the periodicity of the flicker data is utilized, the correction value calculator 32* is to hold a part of waveforms of the flicker data FD1 and FD2 as shown in FIGS. 13A and 13B. Also, flicker data can appropriately be calculated even with any other memory than the ROM. In this embodiment, one flicker correction data FD corresponding to a waveform shown in FIG. 13C, for example, is synthesized by combining the two flicker data FD1 and FD2 together. However, three or more flicker data can be combined together to synthesize various flicker correction data FD. The flicker correction data FD is updated once by a value depending upon each line per line.

Since the flicker varies in level correspondingly to the value of each pixel, the level adjuster 33* adjusts the level of the flicker correction data FD for each pixel by the use of the image signal DV_* digitized by the A-D converter 20* and calculates a correction value CFD for each pixel.

Note that this embodiment is adapted so that the correction value monotonously increases correspondingly to a pixel value for there has been observed a tendency that the flicker level also increases linearly correspondingly to a pixel value. Also, since no flicker is observed when the pixel value is extremely small or large, the embodiment is adapted to make a calculation taking this feature in account. However, the present invention is not limited to this embodiment.

In the flicker correction circuit 30*, the adder 34* adds the correction value CFD for each pixel to the image signal DV_* to provide a corrected image signal CV_*.

Figure 14:
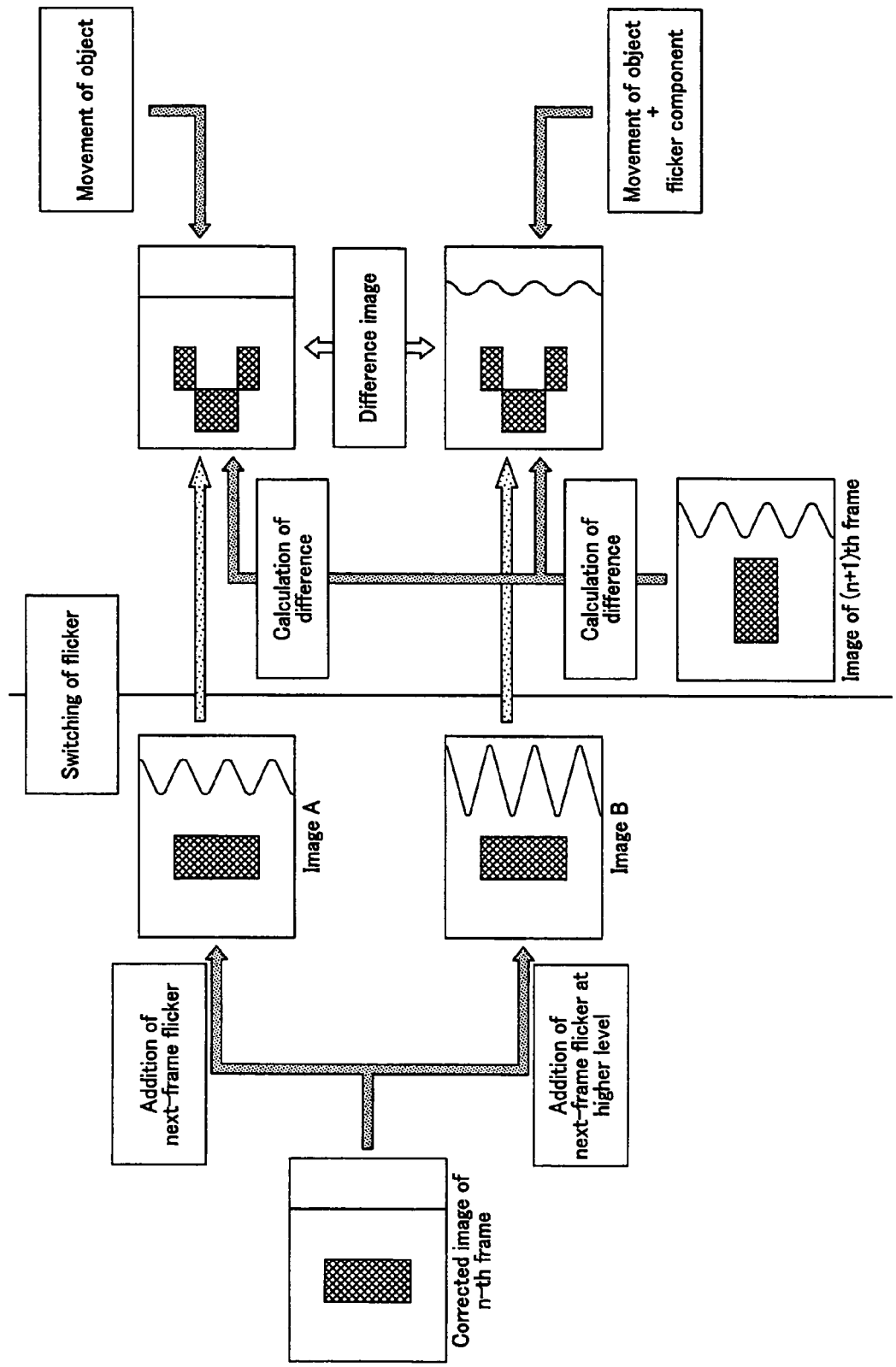
FIG. 14 schematically illustrates an algorithm for correction error detection in the image pickup device.

In this image pickup device 100, each of the correction error detectors 40R, 40G and 40B detects a correction error using an algorithm shown in FIG. 14.

More specifically, after "corrected image of n-th frame" is outputted, a flicker state of the (n+1)th frame is predicted from the "correction image of n-th frame" and a flicker component is added to the "correction image of n-th frame". An image thus resulted will be referred to herein as "image A" hereunder. Also, a flicker state of the (n+1)th frame is predicted and a flicker component has the address thereof shifted is added to the (n+1)th frame. An image thus resulted will be referred to as "image B" hereunder. A difference is calculated between these two images A and B and the "correction image of n-th frame" including the flicker component. Concerning the "image A", only movement of an object is outputted as a difference image. Concerning the "image B", both the movement of the object and flicker component are outputted as difference images. As will be seen from comparison between these differences, the difference of the "image A" is smaller. On the contrary, it can be considered that in case the difference determined from the "image B" is smaller than that of the "image A", a flicker having the address thereof shifted can be predicted correctly. That is to say, a smaller difference means that a flicker has correctly been predicted. Thus, shifting the flicker address for a smaller difference can end up with a correction error limited within a certain range.

Figure 15:
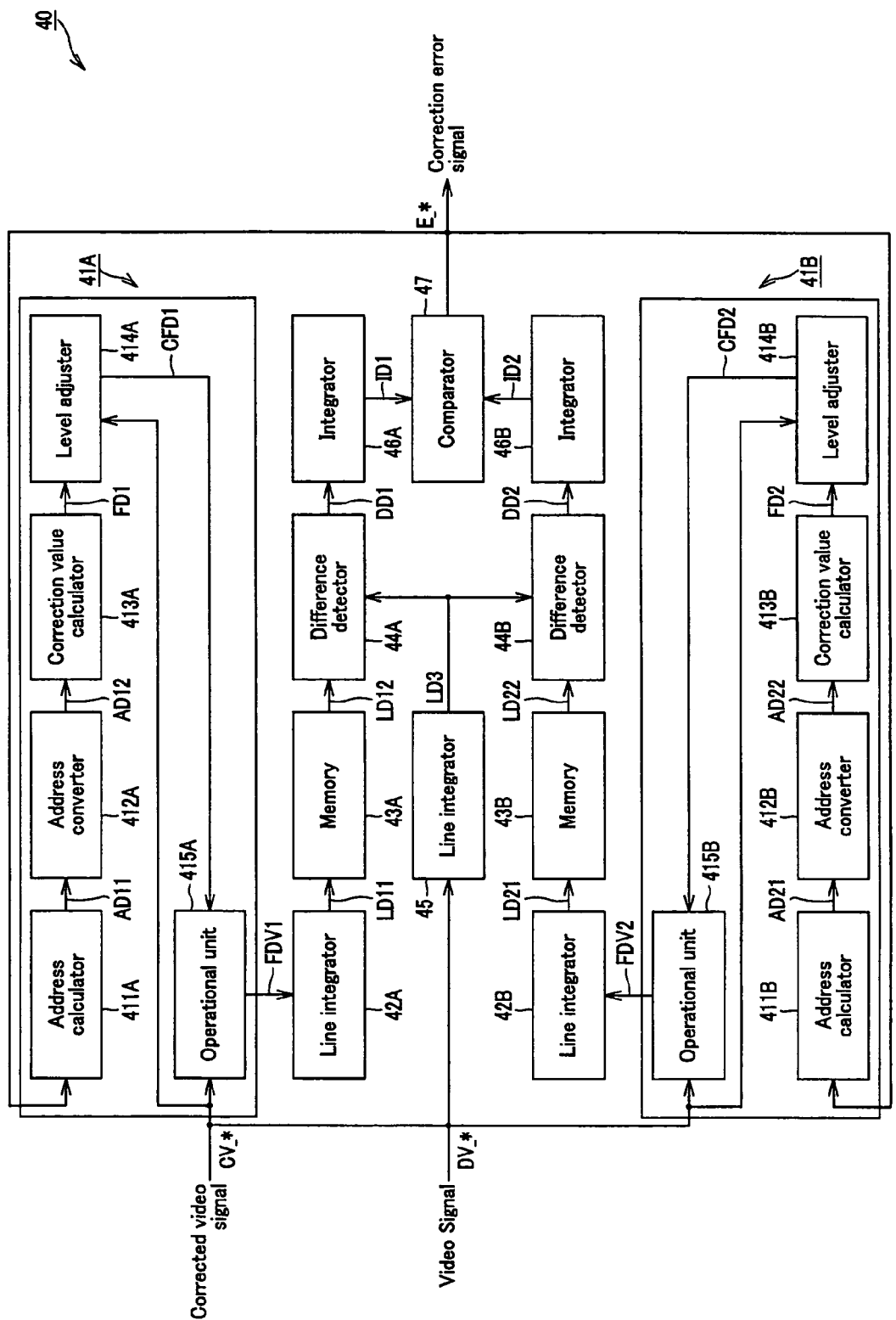
FIG. 15 is a schematic block diagram of a correction error detector included in the image pickup device.

Each of the correction error detectors 40R, 40G and 40B uses a correction error detector 40* constructed as shown in FIG. 15. It should be noted here that the asterisk (*) stands for "R (red)", "G (green)" and "B (blue)".

The correction error detector 40* includes flicker-added signal generators 41A and 41B supplied with an image signal CV_* flicker-corrected by the flicker correction circuit 30*, line integrators 42A and 42B supplied with flicker-added signals FDV1 and FDV2 generated by the flicker-added signal generators 41A and 41B, respectively, memories 43A and 43B supplied with line data LD11 and LD21 integrated by the line integrators 42A and 42B, respectively, difference detectors 44A and 44B supplied with line data LD12 and LD22 read from the memories 43A and 43B, respectively, line integrator 45 supplied with an image signal DV_* digitized by the A-D converter 20*, integrators 46A and 46B supplied with difference data DD1 and DD2 detected by the difference detectors 44A and 44B, respectively, comparator 47 supplied with integrated data ID1 and ID2 provided by the integrators 46A and 46B, respectively, etc. Line data LD3 provided by the line integrator 45 will be supplied to each of the difference detectors 44A and 44B, and a correction error signal E_* provided as a comparison output from the comparator 47 be supplied to each of the flicker-added signal generators 41A and 41B.

Each of the flicker-added signal generators 41A and 41B includes address calculators 411A and 411B supplied with the correction error signal E_* supplied as a comparison output from the comparator 47, address converters 412A and 412B supplied with addresses AD11 and AD21 calculated by the address calculators 411A and 411B, respectively, correction value calculators 413A and 413B supplied with addresses AD12 and AD22 calculated by the address calculators 412A and 412B, respectively, level adjusters 414A and 414B supplied with flicker data FD1 and FD2 calculated by the correction value calculators 413A and 413B, respectively, and operational units 415A and 415B supplied with an image signal DV_* digitized by the A-D converter 20*. The image signal DV_* digitized by the A-D converter 20* will be supplied to the level adjusters 414A and 414B, and correction values CFD1 and CFD2 generated by the level adjusters 414A and 414B, respectively, are supplied to the operational units 415A and 415B, respectively.

In the correction error detector 40* constructed as above, the address calculators 411A and 411B calculate addresses AD11 and AD21 in the ROM on the basis of the correction error signal E_*. The addresses to be thus calculated are resulted from shifting the top address of a flicker of a next frame in the positive- or negative-going direction. These addresses are calculated as in the address calculator 31* in the flicker correction circuit 30*. Also, the ROM included in the correction error detector 40* is identical to that included in the flicker correction circuit 30*.

The address converters 412A and 412B convert the addresses AD11 and AD21 calculated by the address calculators 411A and 411B, respectively, into addresses AD12 and AD22, respectively, from which flickers of a next frame can be reproduced. That is, they convert the addresses AD1 and AD2 into addresses opposite in phase to the addresses AD1 and AD2. The addresses AD12 and AD22 converted by the address converters 412A and 412B, respectively, are resulted from prediction of flickers of the next frame, but not intended for correction of the flickers.

The correction value calculators 413A and 413B calculate flicker data FD1 and FD2 on the basis of the addresses AD12 and AD22, respectively, converted by the address converters 412A and 412B, respectively. The flicker data FD1 and FD2 are also determined per line as in the flicker correction circuit 30*. The correction value calculators 413A and 413B are similarly constructed to the correction value calculator 32* included in the flicker correction circuit 30*.

Also in the correction value detectors 413A and 413B, the image signal DV_* is passed through low-pass filters (LPF) 415A and 415B as in the flicker correction circuit 30* to remove noises from the image signal DV_*, and the noise-removed image signal DV_* is supplied to the level adjusters 414A and 414B.

The level adjusters 414A and 414B calculate correction values CFD1 and CFD2 for each pixel from the image signal DV_* digitized by the A-D converter 20* and flicker data FD1 and FD2 calculated by the correction value calculators 413A and 413B, respectively.

The level adjusters 414A and 414B are constructed like the level adjuster 33* included in the flicker correction circuit 30*.

The operational units 415A and 415B generate flicker-added signals FDV1 and FDV2 of a next frame from the correction values CFD1 and CFD2 for each pixel and flicker-corrected image signal CV_*.

The line integrators 42A and 42B calculate line data LD11 and LD21 by integrating certain segments of the flicker-added signals FDV1 and FDV2 of the next frame, respectively. The "segment" may be of an arbitrary value as a horizontal size so far as it is within an image acquired horizontally. With a larger segment, a correction error can be detected with a higher accuracy. The vertical size of the segment may be an integral multiple of the cycle of the light and dark fringes of a flicker within one screen. More specifically, the segment may be given a size of 1000 horizontal pixels by 675 vertical pixels (=337.5×2), namely, of 1000× 675 pixels.

The line data LD11 and LD21 calculated by the line integrators 42A and 42B are stored in the memories 43A and 43B, respectively, until the image signal DV_* of a next frame is supplied. When the image signal DV_* of the next frame is supplied, the line integrator 45 makes line integration of the same segments as those of the flicker-added signals FDV1 and FDV2 which have been integrated to calculate the line data LD3.

The line data LD12 and LD22 stored in the memories 43A and 43B, respectively, and line data LD3 of the next-frame image signal DV_* corresponding to the lines of the line data LD12 and LD22 are supplied to the difference detectors 44A and 44B to provide difference data DD1 and DD2.

The integrators 46A and 46B provide integrated data ID1 and ID2, respectively, by integrating the two difference data DD1 and DD2, respectively.

Then, the comparator 47 judges, by making a comparison in size between these integrated data ID1 and ID2, in which direction an address is shifted for prediction of a correct flicker, positive- or negative-going. For example, in case the integrated data ID* obtained with the address shifted in the positive-going direction is smaller than the integrated data ID* obtained with the address shifted in the negative-going direction, a correction error signal E_* is outputted to shift the address in the positive-going direction.

The correction error is minimized by supplying the correction error signal E_* to the address calculator 31 of the flicker correction circuit 30* and address calculators 411A and 411B of the correction error detector 40* to shift the address in a correct direction toward a flicker.

It should be understood by those skilled in the art that various modifications, combinations, sub-combinations and alterations may occur depending on design requirements and other factors insofar as they are within the scope of the appended claims or the equivalents thereof.

What is claimed is:

1. A flicker correction method in which a flicker is corrected by predicting, from a present input frame image, a flicker component in an image of a next frame and adding a correction value to the next frame image on the basis of the predicted flicker component, the method comprising:

holding a plurality of flicker data;

calculating the correction value by combining a plurality of flicker data together at a ratio determined based on a shutter speed and frame rate using a flicker correction hardware circuit; and adding the calculated correction value to the present input frame image.

2. A flicker correction device comprising:

flicker correcting means for making flicker correction by adding a flicker correction signal to an input image signal; and correction error detecting means for detecting a correction error by predicting, based on an image signal whose flicker has been corrected by the flicker correcting means and an image signal whose flicker is not yet corrected, a correction error by predicting a flicker image resulted from correction-level flicker correction of an image signal of a next frame and making a comparison between a predicted flicker image and input next-frame image signal, the flicker correcting means including a flicker correction signal generating means for generating a flicker correction signal by reading a plurality of flicker data from a flicker data memory holding a plurality of flicker data correspondingly to the correction error detected by the correction error detecting means and combining a plurality of flicker data together at a ratio determined based on a shutter speed and frame rate of the input image signal.

3. An image pickup device including a flicker correction device to make flicker correction by adding a flicker correction signal to an image signal acquired by an image sensing means, the flicker correction device comprising:

flicker correcting means for making flicker correction by adding a flicker correction signal to an input image signal; and correction error detecting means for detecting a correction error by predicting, based on an image signal whose flicker has been corrected by the flicker correcting means and an image signal whose flicker is not yet corrected, a correction error by predicting a flicker image resulted from correction-level flicker correction of an image signal of a next frame and making a comparison between the predicted flicker image and input next-frame image signal, the flicker correcting means including a flicker correction signal generating means for generating a flicker correction signal by reading a plurality of flicker data from a flicker data memory holding a plurality of flicker data correspondingly to the correction error detected by the correction error detecting means and combining a plurality of flicker data together at a ratio determined based on a shutter speed and frame rate of the input image signal.

4. A flicker correction device comprising:

a flicker correction unit configured to correct flicker by adding a flicker correction signal to an input image signal; and a correction error detector configured to detect a correction error by predicting, based on an image signal whose flicker has been corrected by the flicker correction unit and an image signal whose flicker is not yet corrected, a correction error by predicting a flicker image resulted from correction-level flicker correction of an image signal of a next frame and making a comparison between the predicted flicker image and input next-frame image signal, the flicker correction unit including a flicker correction signal generator configured to generate a flicker correction signal by reading a plurality of flicker data from a flicker data memory holding a plurality of flicker data correspondingly to the correction error detected by the correction error detector and combining a plurality of flicker data together at a ratio determined based on a shutter speed and frame rate of the input image signal.

5. An image pickup device including a flicker correction device to make flicker correction by adding a flicker correction signal to an image signal acquired by an image sensor, the flicker correction device comprising:

a flicker correction unit configured to correct flicker by adding a flicker correction signal to an input image signal; and a correction error detector configured to detect a correction error by predicting, based on an image signal whose flicker has been corrected by the flicker correction unit and an image signal whose flicker is not yet corrected, a correction error by predicting a flicker image resulted from correction-level flicker correction of an image signal of a next frame and making a comparison between the predicted flicker image and input next-frame image signal, the flicker correction unit including a flicker correction signal generator configured to generate a flicker correction signal by reading a plurality of flicker data from a flicker data memory holding a plurality of flicker data correspondingly to the correction error detected by the correction error detector and combining a plurality of flicker data together at a ratio determined based on a shutter speed and frame rate of the input image signal.

6. The device according to claim 5, wherein the flicker correction unit is configured to generate the flicker correction signal such that monotonously increases corresponding to the pixel value.

7. The device according to claim 5, wherein the flicker correction unit is configured to generate the flicker correction signal of zero when the pixel value is extremely small.

8. The device according to claim 5, wherein the flicker correction unit is configured to generate the flicker correction signal of zero when the pixel value is extremely large.

* * * * *